United States Patent Office 2,889,344
Patented June 2, 1959

2,889,344

DEHYDRO-16-ACETOXY-17-HYDROXYPREGNA-3,20-DIONES

Clarence G. Bergstrom, Chicago, Ill., assignor to G. D. Searle & Co., Chicago, Ill., a corporation of Delaware No Drawing. Application December 16, 1957
Serial No. 702,817

3 Claims. (Cl. 260—397.45)

This invention relates to dehydro-16-acetoxy-17-hydroxypregna-3,20-diones, and processes for the manufacture thereof. More particularly, this invention relates to compounds of the formula

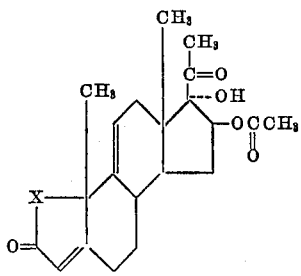

wherein X represents an ethylene or vinylene radical.

The compounds to which this invention relates are useful because of their valuable pharmacological properties. For example, they are anti-inflammatory agents, being characterized by such qualities as a capacity to block cellular histamine reactions, an ability to protect against iritic hyperemia, and a disposition to inhibit the formation of granulomatous tissue.

The claimed compositions are manufactured by treating 16,17-epoxypregna-4,9(11)-diene-3,20-dione with sodium acetate and acetic acid to give the corresponding 16-acetoxy-17-hydroxy compound, which in turn is dehydrogenated to the $\Delta^1$ analog via selenous acid in tert.-butyl alcohol containing a trace of acetic acid.

The following examples described in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted.

EXAMPLE 1

*16β - acetoxy - 17α - hydroxypregna - 4,9(11) - diene-3,20-dione.*—To a boiling solution of 50 parts of sodium acetate in 50 parts of acetic acid is added 5 parts of 16α,17α-epoxypregna-4,9(11)-diene-3,20-dione. The reactants are maintained at the boiling point under reflux for 1 hour, following which they are dumped into a mixture of 400 parts of benzene and 500 parts of water. The benzene phase is separated and washed twice with equi-volume quantities of water, then with a like volume of saturated aqueous sodium bicarbonate, and finally twice more with equi-volume amounts of water. The resultant solution is dried over anhydrous sodium sulfate and then stripped of solvent by distillation. Recrystallized from a mixture of acetone and hexane, and then from acetone alone, the residue melts at 221–223° C. It has the formula

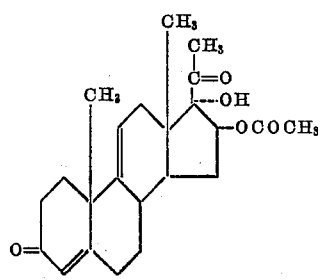

EXAMPLE 2

*16β -acetoxy - 17α - hydroxypregna - 1,4,9(11) - triene-3,20-dione.*—To a boiling solution of 25 parts of 16β-acetoxy - 17α - hydroxypregna - 4,9(11) - diene - 3,20-dione in 2000 parts of tert.-butyl alcohol containing 25 parts of acetic acid is added, under a nitrogen atmosphere, 2 parts of selenous acid. The reactants are maintained at the boiling point in a nitrogen atmosphere under reflux for a total of 21 hours, an additional 2 parts of selenous acid being introduced after the first 5 hours of the heating period. The yellow reaction mixture is concentrated to approximately ¼ volume, whereupon 5600 parts of ethyl acetate is stirred in, causing precipitation of a black finely-divided solid. The resultant mixture is twice washed with saturated aqueous sodium bicarbonate and then 3 times with water, following which it is dried over anhydrous sodium sulfate and taken to dryness at reduced pressure. The brown crystalline residue is purified by chromatography on silica gel, using benzene and ethyl acetate as developing solvents. From the eluate comprising 20 percent ethyl acetate, there is obtained, on evaporation of solvent and repeated recrystallization of the residue from mixtures of acetone and hexane, 16β - acetoxy - 17α - hydroxypregna - 1,4,9(11) - triene-3,20-dione, melting at 174–176° C. Further crystallizations from aqueous acetone increase this melting point to 177–179° C. The product has the formula

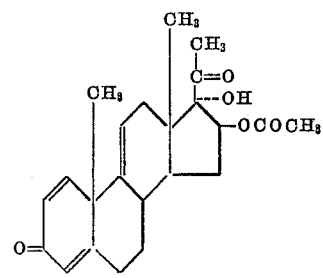

What is claimed is:
1. A compound of the formula
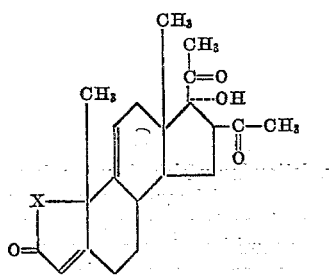
wherein X is selected from the group consisting of ethylene and vinylene radicals.
2. 16β-acetoxy-17α-hydroxypregna-4,9(11)-diene-3,20-dione.
3. 16β - acetoxy - 17α - hydroxypregna - 1,4,9(11)-triene-3,20-dione.
References Cited in the file of this patent
UNITED STATES PATENTS
| | | |
|---|---|---|
| 2,703,799 | Bergstrom | Mar. 8, 1955 |
| 2,756,179 | Fried et al. | July 24, 1956 |
| 2,773,058 | Bernstein et al. | Dec. 4, 1956 |